H. A. MARTIN.
CREDIT ACCOUNT REGISTER.
APPLICATION FILED MAR. 19, 1917.
1,331,021.
Patented Feb. 17, 1920.
6 SHEETS—SHEET 1.
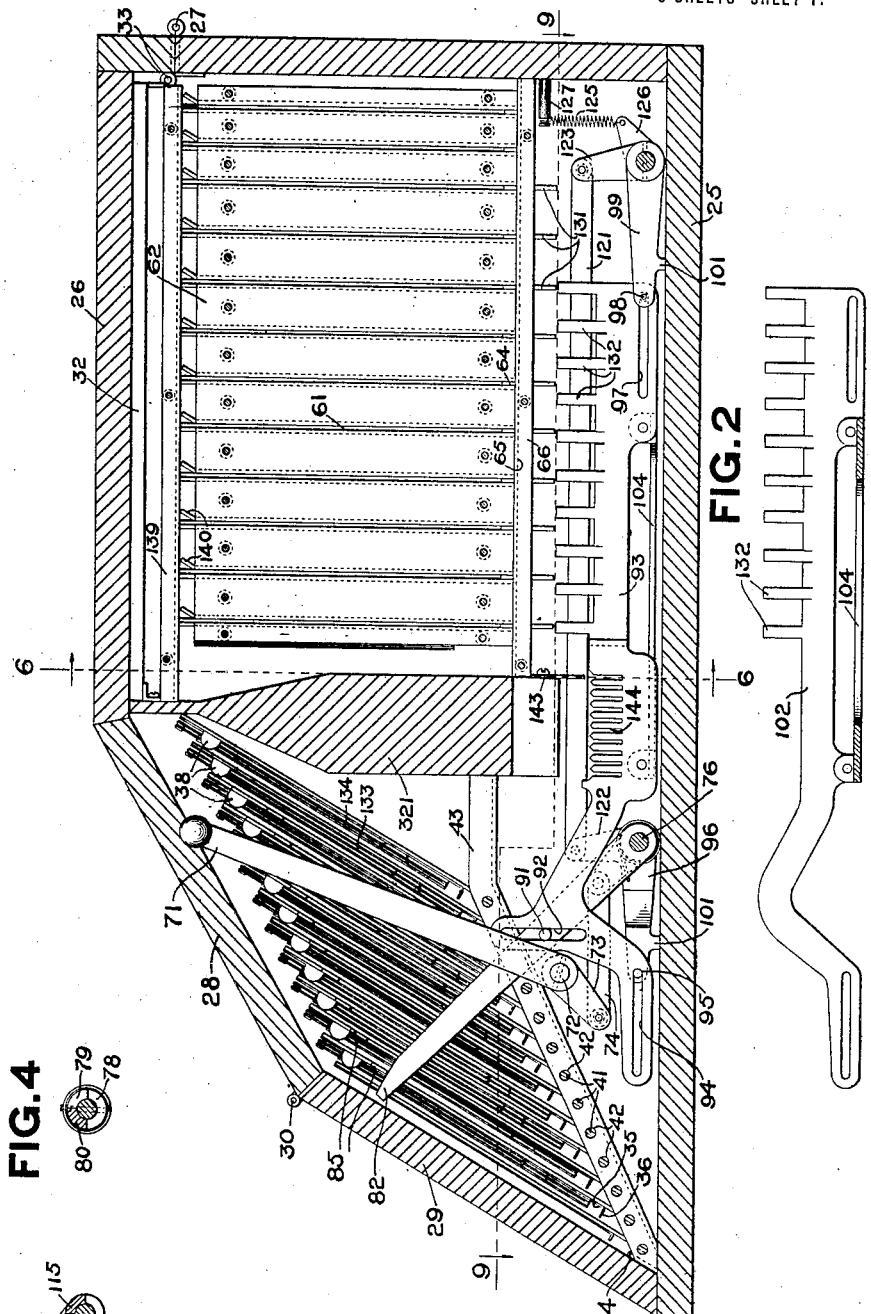
Inventor
HAAKON A. MARTIN
by R. C. Glass.
Attorney

H. A. MARTIN.
CREDIT ACCOUNT REGISTER.
APPLICATION FILED MAR. 19, 1917.

1,331,021.

Patented Feb. 17, 1920.
6 SHEETS—SHEET 2.

Inventor
HAAKON A. MARTIN
by R. C. Glass
Attorney

H. A. MARTIN.
CREDIT ACCOUNT REGISTER.
APPLICATION FILED MAR. 19, 1917.
1,331,021.
Patented Feb. 17, 1920.
6 SHEETS—SHEET 3.
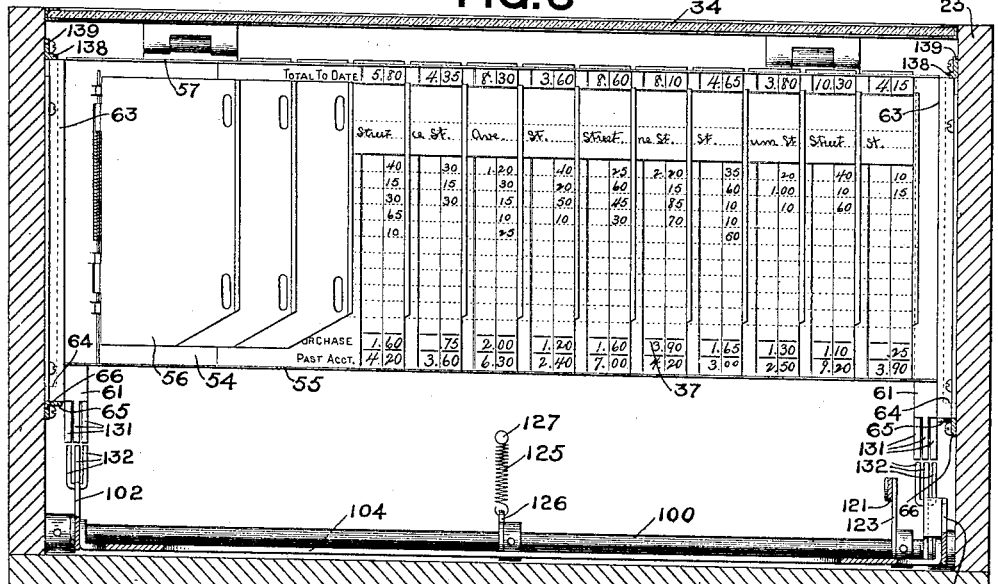
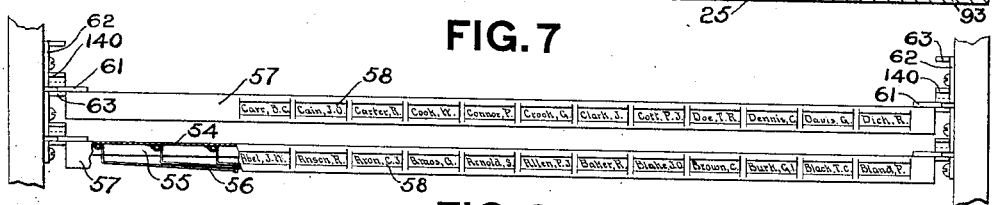
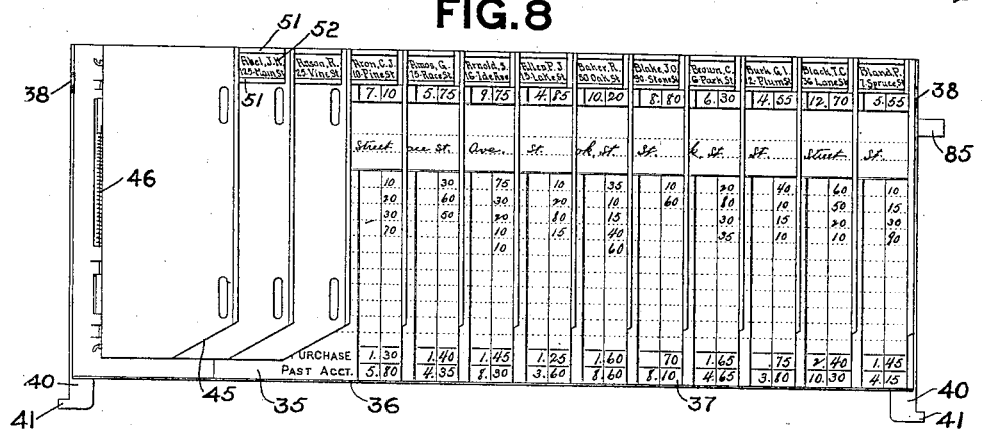
Inventor
HAAKON A. MARTIN
by R. C. Glass
Attorney

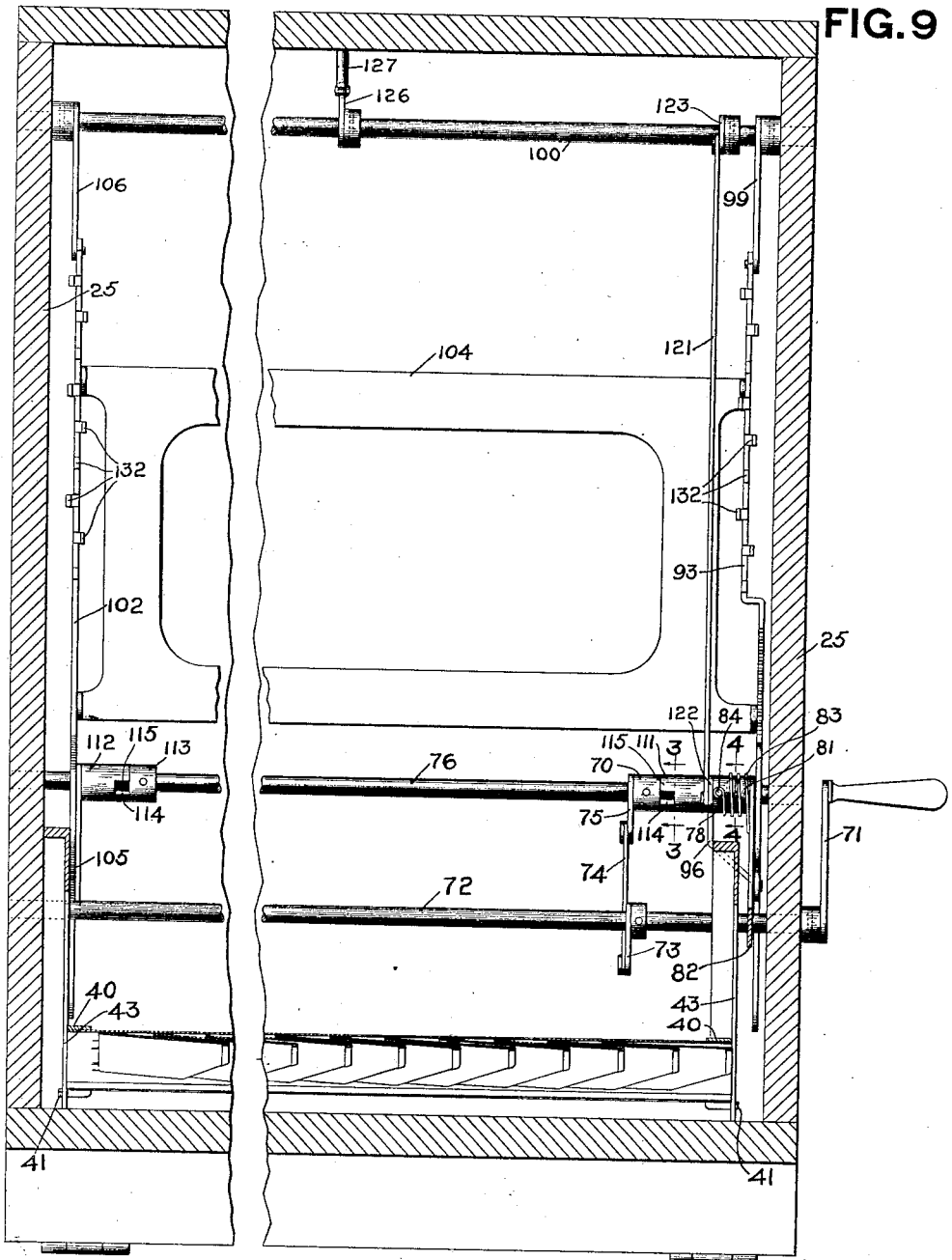

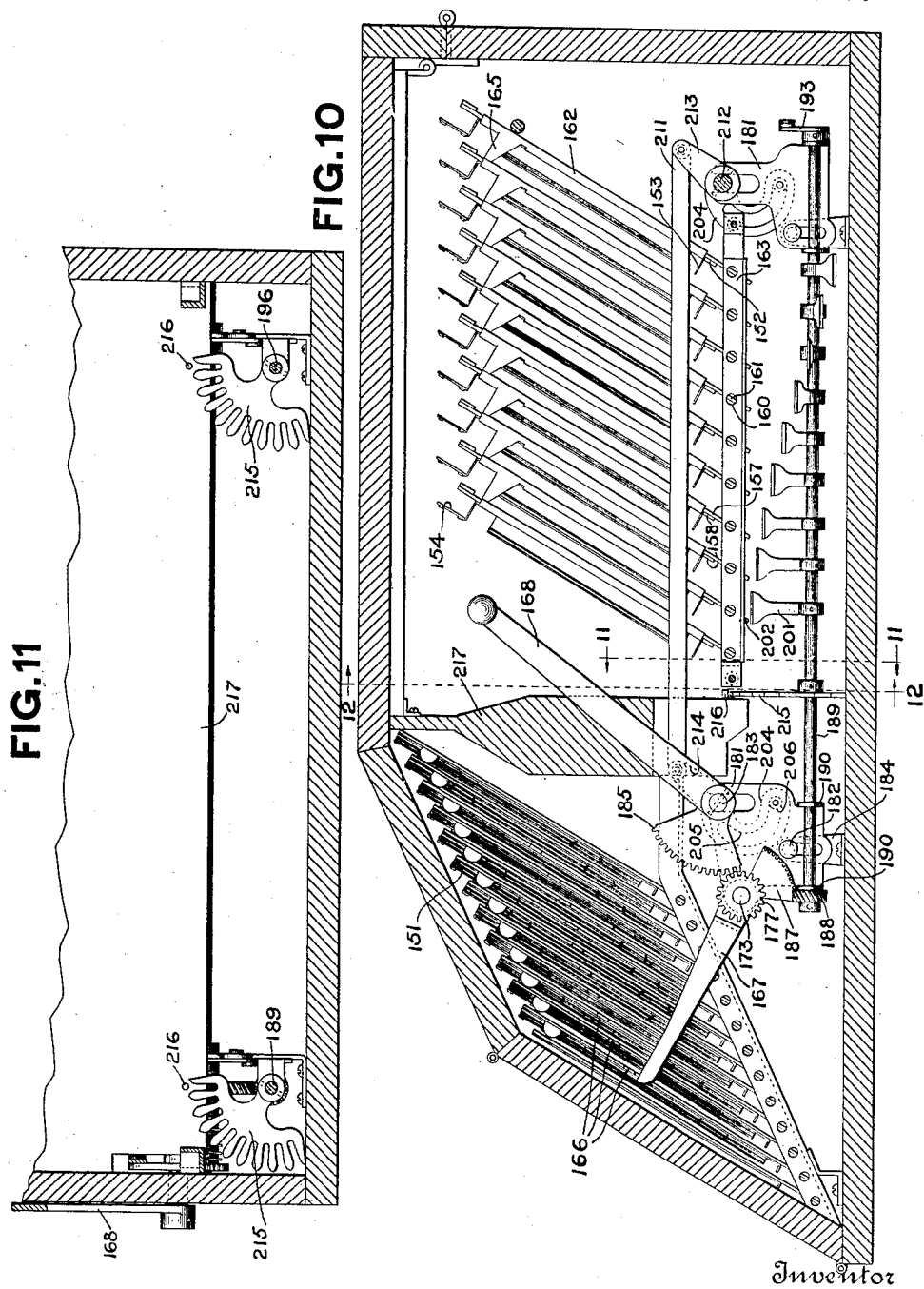

H. A. MARTIN.
CREDIT ACCOUNT REGISTER.
APPLICATION FILED MAR. 19, 1917.

1,331,021.

Patented Feb. 17, 1920.
6 SHEETS—SHEET 6.

Inventor
HAAKON A. MARTIN
by R. A. Glass
Attorney

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

CREDIT-ACCOUNT REGISTER.

1,331,021.   Specification of Letters Patent.   Patented Feb. 17, 1920.

Application filed March 19, 1917. Serial No. 155,764.

*To all whom it may concern:*

Be it known that I, HAAKON A. MARTIN, a citizen of the United States, residing at Dayton, in the county of Montgomery and State of Ohio, have invented certain new and useful Improvements in Credit-Account Registers, of which I declare the following to be a full, clear, and exact description.

This invention relates generally to filing systems and has particular reference to filing cabinets for filing memoranda regarding transactions with customers in retail stores.

The broad object of the invention is to provide an improved file for protecting the proprietor against accidental loss of such memoranda and against loss on account of clerks destroying or altering memoranda regarding past transactions with a view to favoring certain customers.

A more specific object is to provide an improved permanent file which is normally inaccessible to the clerks and in which the memoranda regarding transactions occurring during the day, that is, current records, may be filed at the end of the day by the proprietor.

Still another object of the invention is to provide means for operating the permanent file to expose to the view of the clerk handling a current transaction the amount due on the past account of the customer so that the amount due may be brought forward to the memorandum which is at the time being made out.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Figure 1 is a right side elevation of the file with the right hand side of the casing omitted.

Fig. 2 is a detail of a selector bar for operating the permanent file.

Fig. 3 is a section taken on the line 3—3 (Fig. 9) looking in the direction of the arrows.

Fig. 4 is a section taken on the line 4—4 (Fig. 9) looking in the direction of the arrows.

Fig. 6 is a section taken on the line 6—6 (Fig. 1) looking in the direction of the arrows.

Fig. 7 is a detail top view of two of the sections of the permanent file and shows the manner in which the permanent file sections are constructed and mounted in the cabinet.

Fig. 8 is a detail of one of the temporary filing leaves or sections.

Fig. 9 is a section partly broken away taken on the line 9—9 (Fig. 1) looking in the direction of the arrows.

Fig. 10 is a right side elevation of an optional form of the device with the right hand side of the cabinet omitted.

Fig. 11 is a section on the line 11—11 (Fig. 10) looking in the direction of the arrows.

Figure 5:
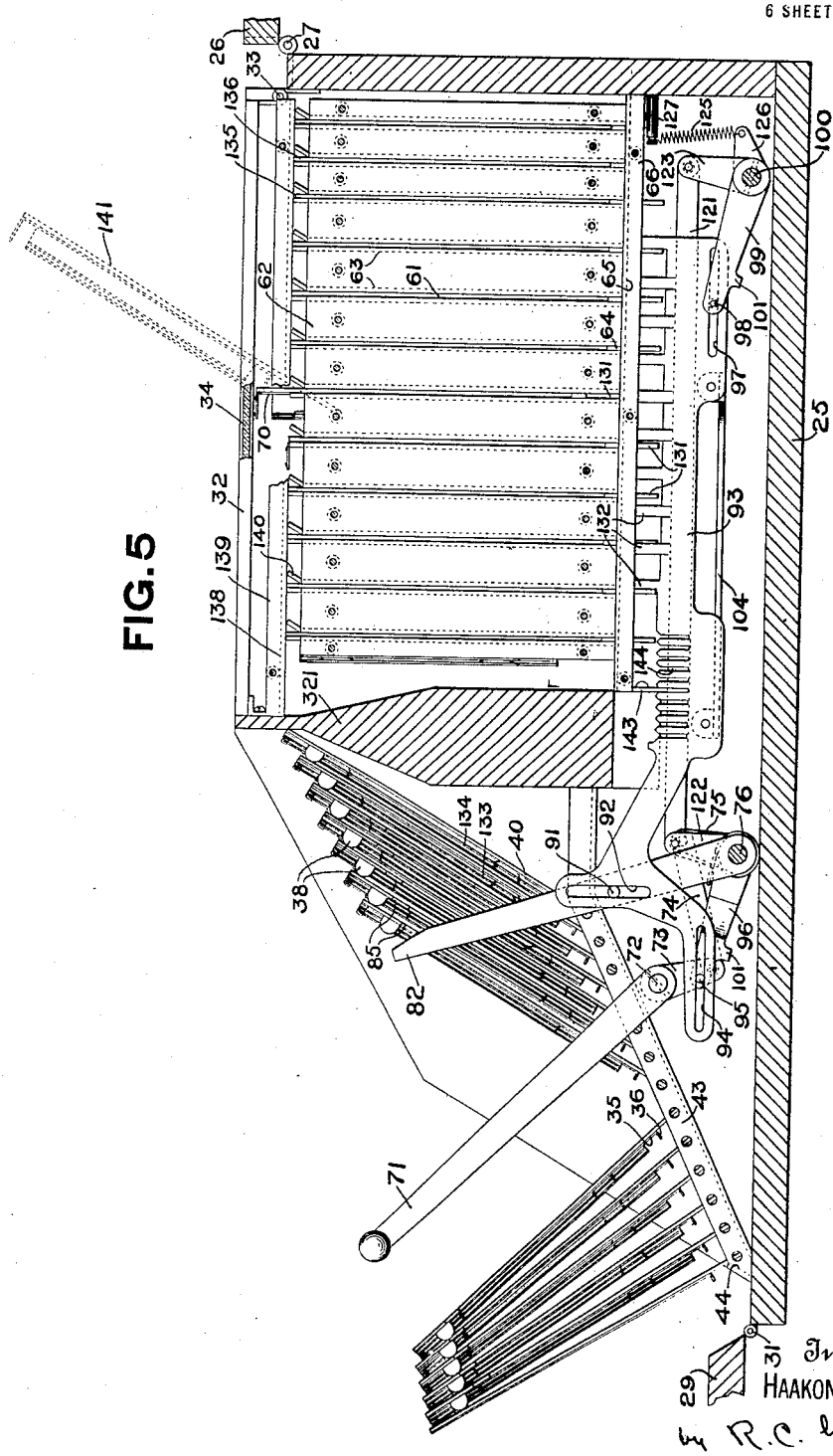
Fig. 5 is substantially the same as Fig. 1, except that it shows the various parts in the positions they occupy when the device has been operated to expose to view the amount due on a customer's past account.
Figure 12:
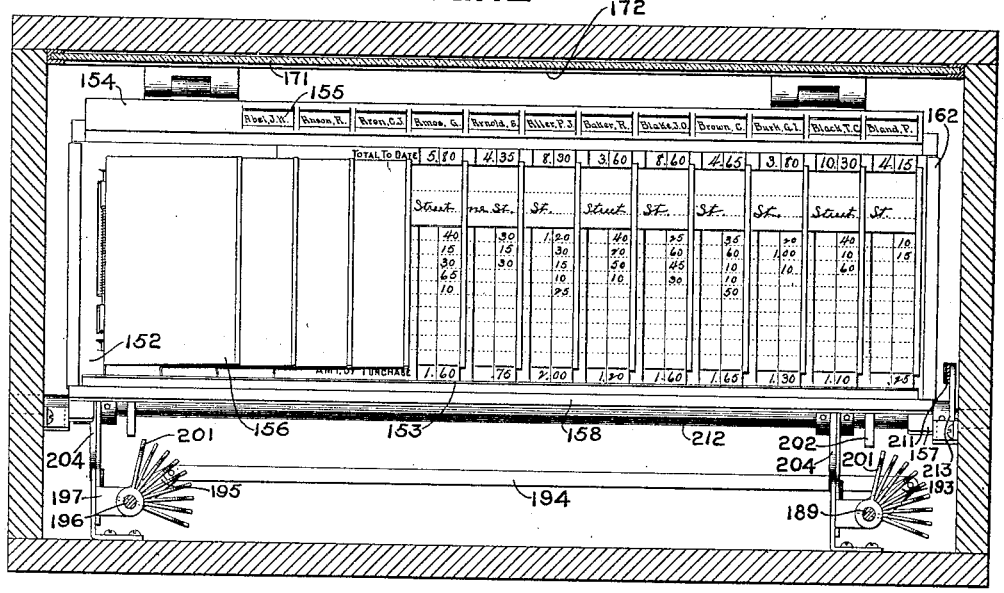
Fig. 12 is a section on the line 12—12 of Fig. 10, looking in the direction of the arrows.
Figure 13:
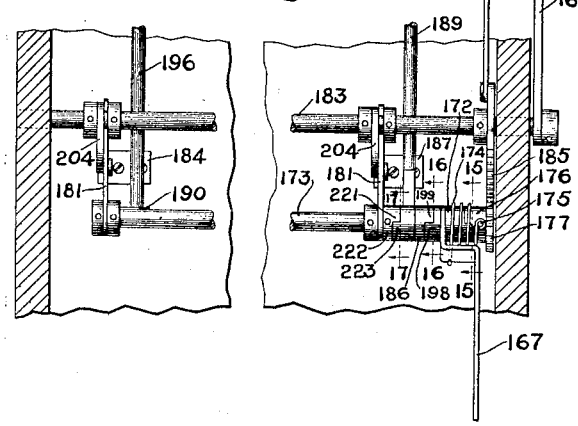
Fig. 13 is a detail of mechanism shown in Fig. 10 for selectively operating the sections in the permanent file to expose the amounts to be brought forward to slips being made out.

The improved device comprises a number of pivoted leaves or sections normally accessible to the clerks and provided with holders to receive charge, received on account and other memoranda as they are made out. These sections are usually collectively referred to herein as the temporary or current file. At the end of the day or any other desired period the contents of the temporary file may be transferred to a permanent file. The permanent file is normally locked by means of a cover or lid having a transparent portion or protected sight opening and comprises a number of slidably mounted customers' account filing sections normally concealing their contents but which may be selectively lifted far enough for the amount due on past account as shown by the last memorandum filed in a customer's compartment to be visible to the clerk.

The temporary file includes, in this instance, two sections for filing miscellaneous memoranda which do not require consulting any past record or account and these as well as all the other temporary filing sections may be manually operated at will without in any way disturbing or moving the sections in the permanent file. If, however, the temporary file is opened at the proper place to receive a memorandum pertaining to a customer's account, all that is necessary is to pull an operating handle provided for the purpose and the permanent filing section containing the customer's past account will be lifted far enough for the clerk to see the amount which is to be transferred or brought forward to the new memorandum or slip.

The mechanism for lifting the permanent filing sections comprises a flexible finder or controlling member which at the beginning of the movement of the operating handle is swung until it engages a stop on the temporary filing section in which the new slip is to be filed. Connected to the flexible finder is mechanism which moves with the finder until the finder engages said stop. When the finder is arrested by the stop the mechanism moving therewith will have been carried to a position where an operating connection will have been established between the operating handle and the permanent filing section corresponding to the temporary filing section on which the effective stop is mounted. Continuation of the movement of the operating handle will then lift the permanent filing section by the action of a selector member into position for the amount owing by the customer to be seen and the return of the operating handle to its original position will permit the permanent filing section to drop to its normal position and again conceal the contents.

The foregoing is thought to give a good general idea of the construction and operation of the improved device. Describing the device in detail, the filing sections are inclosed in a casing or housing 25 (Figs. 1, 5 and 9) of fireproof material or any other material desired. The casing comprises a lid 26 (Fig. 1) hinged at 27 to the main part of the casing 25, also a lid consisting of two portions 28 and 29, hinged together at 30 and connected to the main part of the casing by a hinge 31. Although nothing of the kind is shown in the drawings, it is apparent that the lids may be equipped with a lock to prevent access to the interior of the casing.

The permanent file is provided with a lid 32 (Figs. 1 and 5) hinged at 33 to the casing, and provided with a sheet 34 of glass or other material permitting sight therethrough while protecting the sight opening. The lid 32 is provided with a lock (not shown) coöperating with a cross partition 321 to prevent the clerks or other unauthorized persons from having access to the permanent file, but the protected sight opening 34 of the lid allows the clerks to read the amounts to be brought forward when the permanent file has been operated for that purpose.

The temporary file sections each consists of a plate 35 (Figs. 1, 5 and 8) of sheet metal formed at the bottom to provide a ledge 36 to support the memoranda or slips 37 and prevent them from working down out of proper position. At their sides the plates 35 have formed thereon forwardly projecting lugs 38 of sufficient length to space the temporary filing sections apart and prevent one section from disturbing the slips filed in another when the sections are moved. Fastened to the sides of the plates 35 are strips 40 provided with shoulders 41 to engage circular openings 42 in angle bars 43 suitably attached to the casing, the shoulders 41 and circular openings 42 coöperating to form pivots for the plates 35. Lugs 44 formed on the bars 43 serve as stops or supports for the temporary filing sections when they are swung forward as shown in Fig. 5.

Hinged on each plate 35 are plates 45 provided with springs 46 tending at all times to swing the plates 45 in one direction. At their upper ends the plates 35 have struck forward from their material, portions 51 (Fig. 8) suitably formed to receive cards 52 bearing the names and addresses of customers. After a memorandum such as a charge or received on account slip has been made out, the temporary filing sections are manually rocked on their pivots 41 to open the temporary file to expose the section assigned the customer and the plates 45 are then opened against the tension of their springs 46 far enough to permit inserting the slip so that it will occupy a position such as shown in Fig. 8.

The permanent file sections are in several respects like the temporary sections just described. They each consist of a plate 54 (Figs. 6 and 7) provided with a slip supporting ledge 55 and have hinged thereon spring tensioned plates 56 shaped to form separate filing compartments for customers' accounts. The tops of the plates 54 are formed forward as shown at 57 (Fig. 7)

and these projecting portions are constructed to receive index cards 58.

Fastened to the vertical edges of the plates 54 are strips 61. Attached to the sides of the casing 25 are a number of plates 62 provided with inwardly extending flanges 63, the plates being spaced apart just far enough for their flanges to form guiding slots into which the edges of the strips 61 extend. Projecting laterally from the strips 61 are lugs 64 normally resting on inwardly extending flanges 65 of angle bars 66 fastened to the casing 25. It is clear that this construction permits a sliding vertical movement of the plates 54.

The memorandum slips 37 have a space at their upper right hand corners in which the total amount due is filled in. When the slips are filed in the permanent file these amounts will appear under the index cards 58 and in such close relation thereto that there will be no likelihood of confusion in ascertaining the amount to be brought forward to the next slip. After filling in on the new slip information regarding the transaction being made, operating mechanism described later is operated to lift the permanent filing section containing the customer's past account to the position shown at 70 (Fig. 5) and the clerk can then at a glance ascertain the amount to be brought forward.

The operating mechanism just referred to is actuated by an operating handle 71 fastened to a rock shaft 72 journaled in the side plates of the casing. Fastened to the shaft 72 is an arm 73 connected by a link 74 to an arm 75 secured to a rock shaft 76 extending the width of the machine and supported by the casing 25. It is clear that the construction just described is such that by pulling the handle 71 in a counter clockwise direction (Fig. 1) to the position shown in Fig. 5 the shaft 76 will be rocked clockwise as shown in Fig. 1.

Fastened to the shaft 76 is a hub 78 (Figs. 4 and 9) having a laterally extending shoulder 79 coöperating with the shoulder 80 on a hub 81 (Fig. 9) rigid with a detector or finder 82. A torsion spring 83, one end of which is held by a pin 84 in the hub 78 and the other end of which is formed to engage the under side of the finder 82, normally holds the shoulders 79 and 80 on the hubs 78 and 81 in engagement as shown in Figs. 4 and 9. Projecting laterally from each of the temporary file sections is a stop 85, best shown in Fig. 8. When the temporary file is opened as shown in Fig. 5, the stops 85 on the sections swung forward will be carried out of the path of the finder 82 and when the handle 71 is pulled forward the finder 82 will be swung clockwise (Figs. 1 and 5) through the connection afforded by the spring 83 until the upper end of the finder engages the stop 85 on the first section left in normal or accessible position. The finder will then be held against further movement but the hub 78 will contine to move until the end of the forward stroke of the handle 71. The resulting relative movement between the two hubs tensions the spring 83. When the handle 71 is returned to its normal position the spring 83 will, of course, coöperate with the engaged stop 85 to hold the finder 82 and its hub 81 stationary until the shoulder 79 again engages the shoulder 80 and during the final movement of the handle 71 the handle and finder will move in unison until they both reach their starting points.

Projecting from the finder 82 is a stud 91 (Figs. 1 and 5) engaging a slot 92 in a plate 93. The plate 93 has at its forward end a slot 94 surrounding a stud 95 attached to an arm 96 loose on the rock shaft 76. At its rear end the plate 93 has a second slot 97 engaging a stud 98 on an arm 99 fast on a rock shaft 100. The arms 96 and 99 are provided with shoulders 101 which, as shown in Fig. 1, normally rest on the base plate of the casing 25. At the left hand side of the machine is a selector bar or plate 102 (Figs. 2 and 9) similar to the plate 93. A plate 104 (Fig. 9) connects the plates 93 and 102 so that the plates 93, 102 and 104 form a rigid structure. The plate 102, it should be explained, is supported by arms 105 and 106 in the same way as the arms 96 and 99 support the plate 93. It is clear that the slot and pin connection between the finder 82 and plate 93 will when the finder is adjusted, cause a proportional sliding movement of the plates 93 and 102.

The arms 96 and 105 are integral with hubs 111 and 112 loose on the rock shaft 76. The hub 70 of the arm 75 and a hub 113 fastened to the shaft 76 are provided with shoulders 114 to coöperate with but normally at some distance from shoulders 115 on the hubs 111 and 112. The normal relative positions of the shoulders 114 and 115 are such that when the operating handle 71 is pulled forward the shoulders 114 will not engage the shoulders 115 until sufficient time has elapsed for the finder 82 to be swung into engagement with the stop 85 on any one of the temporary filing sections 35. After this time has elapsed the shoulders 114 will engage the shoulders 115 and the arms 96 and 105 will be rocked clockwise to the positions shown in Fig. 5. This movement will be transmitted to the arms 99 and 106 at the rear of the machine by a link 121 connecting an arm 122, integral with the arm 96, and an arm 123 fastened to the shaft 100. The construction is such that when the operating handle 71 is pulled forward the full distance the plates 93 and 102 will first be adjusted by movement of the finder 82 and will then be lifted an invariable extent. When the handle is first moved rearward toward its original position a spring 125 stretched between an arm 126 rigid with the shaft 100 and a stud 127 fastened to the casing 25 will lower the plates 93 and 102 and then during the final movement of the handle the finder 82 will slide the plates forward to their original positions.

The first movement of the plates 93 and 102, that is, the sliding movement imparted to them by their connection with the finder 82, is to establish an operating relationship between the plates and the permanent file section which is to be exposed. The strips 61 of the file sections have downwardly extending fingers 131 to coöperate with fingers 132 projecting upward from the plates 93 and 102. The selector members or fingers 131 on the strips 61 and the fingers 132 on the plates 93 and 102 are staggered and the fingers 132 so spaced apart on their plates that at the different positions of the finder 82 only the pair of fingers 132 for the permanent filing section corresponding to the temporary section in accessible or exposed position will be opposite the fingers 131 extending downward from that permanent section. It is apparent that when the plates 93 and 102 are elevated near the end of the forward movement of the handle 71 the fingers 131 and 132 are in coöperating relationship will lift the permanent filing section to the position 70 (Fig. 5) where the balance due from the customer can be seen.

The last two temporary filing sections (designated by the numerals 133 and 134 Figs. 1 and 5) are for C. O. D. or other miscellaneous memoranda not pertaining to regular customers' accounts. The two rear permanent filing sections 135 and 136 are to receive such of these memoranda as are to be preserved. The sections 133 and 134 of the temporary file have no stops 85 thereon and the permanent miscellaneous sections have no fingers 132 to coöperate with the fingers 131 on the plates 93 and 102. If the handle 71 is operated when either of the two sections 133 and 134 is in exposed position the permanent sections 135 and 136 will not be affected in any way. It is only when one of the customers' temporary file sections 35 is exposed and the handle 71 pulled that a permanent file is lifted to the position where amounts owed by different customers can be seen.

When the proprietor transfers the memoranda from the temporary file to the permanent file he will first unlock the lid or cover 32 and swing it back out of the way. He can then lift the permanent sections up by hand until the shoulders 64 thereon engage the under sides of flanges 138 of angle bars 139 fastened to the sides of the casing. The upper ends of one of each pair of guiding flanges 63 is bent rearward as shown at 140 to permit the permanent filing section which has been lifted, as just described, to be swung rearward to the position indicated by the dotted outline 141 (Fig. 5) and the bent portion 140 of the flange 63 will coöperate with the next adjacent flange 63 to support the file section in raised position. After the slips have been transferred to the permanent file section the section may be returned to the vertical position and allowed to drop back to its starting point.

In order to insure correct operating relationship between the fingers 132 of the plates 93 and 102 with the depending fingers 131 of the permanent filing sections there is provided a blade 143 fastened to the rear side of the cross partition 321. When the plates 93 are positioned and then elevated slots 144 in the plate 93 engage the plate 143. The upper ends of the slots 144 diverge so as to coöperate with the blade 143 to adjust the plate 93 and consequently the plate 102 in either direction to correct position, if for any reason such adjustment should be necessary.

The optional form of the device illustrated in Figs. 10 to 17 inclusive, comprises a set of temporary filing sections designated generally by the numeral 151 (Fig. 10) which are the same in every essential particular as the temporary sections 35 in the preferred form. In the optional form the permanent filing sections designated by the numeral 152 (Figs. 10 and 12) are similar in many respects to the permanent sections 54 in the preferred form the main differences being due to the fact that in the optional form the permanent filing sections are carried by pivoted members and are selectively slidable relative to the pivoted members to expose the amounts due on customers' accounts.

The permanent filing sections 152 are in the form of metal plates having slip supporting flanges 153 at the bottom. At the top the plates are bent first forward and then up as best shown at 154 in Fig. 10. The portions 154 are constructed to receive index cards 155 and pivoted to the face of each of the plates 153 are spring tensioned leaves 156 suitably formed to accommodate a number of slips.

Figure 14:
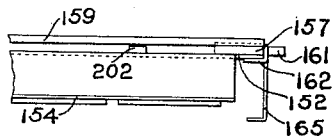
Fig. 14 is a detail illustrating the construction and method of mounting the permanent filing sections employed in the optional form shown in Fig. 10.
Figure 15:
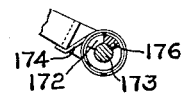
Fig. 15 is a section on the line 15—15 (Fig. 13) looking in the direction of the arrows.
Figure 16:
Fig. 16 is a section on the line 16—16 (Fig. 13) looking in the direction of the arrows.
Figure 17:
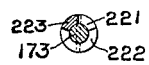
Fig. 17 is a section taken on the line 17—17 (Fig. 13) looking in the direction of the arrows.

As previously stated, the permanent filing sections 152 are slidably mounted on pivoted frames. These frames consist of strips 157 at the sides connected together by cross bars 158 and 159 at the bottom and top respectively, so as to form a unitary rectangular frame. The strips 157 are provided with lugs 161 engaging circular openings 160 in angle bars 163 attached to the sides of the cabinet. Fastened to the rear side of the strips 157 are plates 162 formed as shown in Fig. 14 to constitute guides for the edges of the plates 152 of the permanent file sections. The lower cross bars 158 of the supporting frames serve as stops engaged by the slip supporting flanges 153 of the permanent file sections and limit the downward movement of the sections.

In addition to being formed to serve as guides for the permanent file sections the plates or members 162 have formed thereon lugs or projections 165 (Fig. 10) coöperating with the next adjacent file section to hold the sections apart and prevent one from disarranging the slips filed in another when the sections are moved.

The temporary file members 151 of the optional form have stops 166 coöperating with a finder 167 which is actuated by an operating handle 168. At the beginning of the movement of the handle the finder 167 is moved until it engages the stop 166 on the temporary file member 151 which has been rendered accessible by separating the sections and after the finder has been arrested the permanent file section 152 is then given a sliding movement relative to its support so as to lift it far enough for the totals or amounts due to be visible through the transparent portion 171 (Fig. 12) of a lid 172 inclosing the permanent file.

The finder 167 is fastened to a hub 172 (Figs. 13 and 15) loose on a rock shaft 173. A spring 174 is bent to engage under the finder 167 and is held at its other end by a pin 175 in a hub 176 rigid with a gear 177 fastened to the shaft 173. The shaft 173, it should be stated, is journaled at its ends in plates 181 slidably mounted on studs 182 and a rock shaft 183 journaled in the side plates of the casing. The studs 182 are attached to brackets 184 fastened to the base of the cabinet. The gear 177 meshes with a segment 185 fastened to the rock shaft 183, to which shaft the operating handle 168 is also fastened. Rigid with a hub 186 loose on the shaft 173 is a segment 187 having teeth suitably shaped to coöperate with the teeth of a worm gear 188 fastened to a shaft 189 journaled in lugs 190 formed on the right hand plate 181. At the rear end of the shaft 189 is fastened an arm 193 (Figs. 10 and 12) connected by a link 194 to an arm 195 fastened to a shaft 196 similar to the shaft 189 and supported in the same way by lugs 197 on slidably mounted plates 181. When the handle is pulled forward its first movement will be transmitted through the segment 185 and gear 177 to the finder 167 and the finder will be swung into engagement with the first stop 166 which was left in its path when the temporary file was opened. The extent of movement before the finder 167 is arrested will be transmitted through a shoulder 198 (Figs. 13 and 16) on the hub 172 and a shoulder 199 on the hub 186 to the segment 187, worm gear 188 and the shafts 189 and 196 so that the shafts 189 and 196 will be differentially rotated until the finder 167 is arrested. After the finder 167 is arrested the continued forward movement of the handle 168 will tension the spring 184 and separate the hubs 176 and 172 in the same way as described in connection with the preferred form of the device.

The shafts 189 and 196 have operating fingers 201 fastened to them, said operating fingers being spirally arranged on the shafts so that at each position of the finder 167 the corresponding finger 201 will be in position to coöperate with fingers 202 (Figs. 10 and 12) fastened to the rear sides of the sliding sections 152 of the permanent file. After the shafts 189 and 196 have been set to position the proper operating finger ready to operate the selected permanent file section 152 the plates 181 supporting the shafts 189 and 196 are lifted in unison to elevate the sliding permanent file section far enough for the amount due from the customer to be seen. This lifting movement of the plates 181 is effected by cam members 204 fastened to the shaft 183 and to a shaft 212 across the rear of the machine. These cam members have slots 205 engaging studs 206 attached to the sliding plates 181. The cam grooves 205 are so shaped that the plates 181 remain undisturbed until time enough has elapsed for the finder 167 to move into engagement with the stop 166 on any one of the temporary file sections and the slots then act upon the studs 206 to lift the plates 181 and shafts 189 and 196 so that the positioned fingers 201 will engage the fingers 202 of the permanent file member to be operated and raise the file member to expose its contents. The rock shaft 212 is given its rocking movement through a link 211 connecting an arm 213 fastened to the shaft 212 and an arm 214 rigid with the segment 185.

In order to insure proper alinement of the shafts 189 and 196 before the fingers 201 thereon engage the fingers 202 of the permanent file section the shafts 189 and 196 are both provided with segments 215 (Figs. 10 and 11) having slotted peripheries to engage pins 216 projecting rearward from the cross partition 217 separating the temporary from the permanent file. The upper ends of the slots of the segments 215 diverge so that when the shafts 189 and 196 are elevated as previously described the slots and pins 216 will coöperate to adjust the shafts in either direction if they should happen to be a little out of correct alinement when the upward movement of the shafts begins. This alining mechanism also prevents any change in the setting of the shafts due to the slight reverse movement given the finder 167 when the finder and its supporting plates 181 are elevated.

When the handle 168 is started rearward to its original position the spring 174 will reëstablish operative relationship between the shoulders on the hubs 176 and 172 so that during the rest of the rearward movement of the handle the finder 167 will be carried along to its starting position. A shoulder 221 (Figs. 13 and 17) on a collar 222 fastened to the shaft 173 will at about the same time engage a shoulder 223 on the hub 186 carrying the segment 187 and return the segment and the shafts 189 and 196 to their starting points.

In describing the mechanism it has been necessary incidently to explain the operation to such an extent that it is thought that the usual description including the acts performed by the operator may be omitted.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a filing device, a plurality of file sections arranged in two groups, an operating mechanism for displaying any section in one group, and devices whereby the sections of the other group control the actuation of the said operating mechanism.

2. In a filing device, a plurality of file sections arranged in two groups, an operating device common to the sections of one group and controlled by the sections of the other group for operating the sections of the first mentioned group to display their contents.

3. In a filing device, a plurality of file sections arranged in two groups, an operating mechanism, and means controlled by the sections of one group for selectively controlling the operating mechanism to move the sections of the other group to display their contents.

4. In a filing device, a plurality of filing sections, a housing inclosing a part of the sections, and an operating device common to the inclosed sections and controlled by the uninclosed sections for operating the inclosed sections to display matter filed therein.

5. In a filing device, a plurality of filing sections, a housing inclosing a part of the sections, an operating mechanism, and means controlled by the uninclosed sections for selectively controlling the operating mechanism to move the inclosed sections to display their contents.

6. In a filing device, a plurality of movable filing sections arranged in groups, a casing inclosing one group of sections and having a protected sight opening through which said sections may be viewed, an operating device for moving inclosed sections relative to the transparent portion to display contents of the sections, and devices differentially adjusted under the control of the uninclosed sections whereby the uninclosed sections control the operation of said device.

7. In a filing device, a plurality of movable filing sections arranged in groups, a casing inclosing one group of sections and having a transparent portion through which the inclosed sections may be seen, an operating device for moving the inclosed sections relative to said transparent portion whereby to display contents of any desired section, and devices controlled by the uninclosed sections for establishing operating relationship between the operating device and any desired one of the inclosed filing sections.

8. In a filing device, a plurality of movable filing sections arranged in groups, a casing inclosing one group of sections and having a transparent portion through which said sections may be viewed, an operating handle and devices actuated thereby for moving the inclosed sections relative to said transparent portion to display their contents, and devices actuated by said handle and controlled by the uninclosed sections for establishing operative relationship between the handle and any desired one of the inclosed file sections.

9. In a filing device, a plurality of vertically movable permanent file sections normally in position where their contents are concealed, a casing inclosing said sections and having a transparent portion through which the contents of said sections may be seen when exposed, an operating device for selectively lifting the sections to expose their contents under the transparent portion of the casing, a plurality of temporary file sections, and connections whereby the temporary file sections determine the permanent section to be lifted.

10. In a filing device, a group of temporary file sections manually movable to gain access to any desired section, a group of permanent file sections corresponding to the temporary sections, and an operating mechanism common to the permanent sections and operable to expose the permanent section corresponding to the temporary section which is accessible.

11. In a filing device, a group of temporary file sections manually movable to give access to any desired section, a group of permanent file sections corresponding to the temporary sections, an operating device common to and operable to expose the contents of any desired permanent file section, and stops carried by the temporary file sections controlling said operating device.

12. In a filing device, a group of temporary file sections manually movable to give access to any desired section, a group of permanent file sections corresponding to the temporary sections, an operating handle, and means whereby operation of the handle will expose the contents of the permanent file section corresponding to the temporary section which is accessible.

13. In a filing device, a group of temporary file sections manually movable to give access to any desired section, a group of movable permanent file sections corresponding to the temporary sections, an operating handle, and means whereby operation of the handle will automatically expose the contents of the permanent file section corresponding to the temporary section which is accessible.

14. In a filing device, a group of temporary filing sections manually movable to give access to any desired section, a group of permanent file sections corresponding to the temporary sections, a housing inclosing the permanent sections and having a protected sight opening, an operating handle, and means whereby operation of the handle will automatically expose in reading relation to said protected sight opening contents of the permanent file section corresponding to the temporary section which is accessible.

15. In a filing device, a plurality of filing sections, a housing inclosing a part of the sections, and operating means controlled by the uninclosed sections for selectively positioning the operating means to operate the inclosed sections to display their contents.

In testimony whereof I affix my signature.

HAAKON A. MARTIN.